(12) United States Patent
Jaffarian et al.

(10) Patent No.: US 7,624,059 B1
(45) Date of Patent: Nov. 24, 2009

(54) METHOD FOR IMPROVING THE PERFORMANCE AND PERFORMANCE CHARACTERISTICS OF A MANAGED INVESTMENT

(75) Inventors: Ernest Jaffarian, Naperville, IL (US); Patrick L. Welton, Carmel, CA (US)

(73) Assignee: Gemstone Technologies, LLC, Naperville, IL (US)

( * ) Notice: Subject to any disclaimer, the term of this patent is extended or adjusted under 35 U.S.C. 154(b) by 842 days.

(21) Appl. No.: 10/836,751

(22) Filed: Apr. 30, 2004

Related U.S. Application Data (60) Provisional application No. 60/467,064, filed on May 1, 2003, provisional application No. 60/479,201, filed on Jun. 17, 2003.

(51) Int. Cl.
*G06F 17/60* (2006.01)
(52) U.S. Cl. .................. 705/36 R; 705/35
(58) Field of Classification Search .......... 705/35, 705/36, 36 R
See application file for complete search history.

(56) References Cited

U.S. PATENT DOCUMENTS 6,470,325 B1 * 10/2002 Leemhuis .......... 705/36 R
7,085,738 B2 * 8/2006 Tarrant .............. 705/36 R
2003/0028456 A1 * 2/2003 Yolles ............... 705/35
2003/0120574 A1 * 6/2003 Wallman ............ 705/36

OTHER PUBLICATIONS

Reginold and Andrew Rudd; Financial Analysts Journal; Jan.-Feb. 1987; pp. 27-38; "Incentive Fees: Who Wins? Who Loses?".*
Grinold and Rudd, Incentive Fees: Who wins? Who Loses? Financial Analysts Journal, Jan-Feb 1987, p. 27-38.*

* cited by examiner

*Primary Examiner*—Thomas A Dixon
*Assistant Examiner*—Hao Fu
(74) *Attorney, Agent, or Firm*—Schiff Hardin LLP (57) ABSTRACT

A method and financial product provides improved performance for the investments including, in part, reduced risk by decreasing volatility through the implementation of a financial technology for any financial relationship which utilizes performance-based fees as all or part of the manager compensation. An accrual/reverse accrual approach puts the manager's fees at risk to lower volatility and to benefit the investor. Fractional payouts of the performance fee with accrual carry forward are provided in addition to an asymmetrical accrual. A longer cycle time, high-frequency fee calculations, a pre-funded accrual account and a layered fee schedule provide further stabilizing effects. This is applicable on an individual portfolio level, to a composite portfolio level, as well as on a third party level. The method will benefit any institution or portfolio that can directly or indirectly invest in a portfolio that utilizes performance-based fees or the services of a manager that receives part or all of its compensation from performance-based fees.

30 Claims, 4 Drawing Sheets

Fig. 1

| Accrual and Reverse Accrual Terms (i.e., SIZE) |||
|---|---|---|
| Amount | ...based on... | Outcome |
| Fixed OR Variable | | Dependent on Investment Performance<br>e.g., Fixed intervals (qtly, monthly, etc).<br>e.g., Return distribution or capital placed at-risk<br>OR<br><br>Client Performance (RoR, EPS, etc)<br>e.g., reverse negative performance periods<br>e.g., support a "floor" of positive performance<br>OR<br><br>Accrual Balance<br>OR<br><br>Unrelated Index or Metric<br>(e.g., S&P, Russell 2000)<br>OR<br><br>Statistical or Mathematical Transformation of Any of the Above |

Figure 2

| Independent Basis for Accrual and Reverse Accrual (i.e., TIMING) |||||
|---|---|---|---|---|
| Basis (Timing) | ...based on... | Outcome | ...calculated at... | Frequency |
| Fixed OR Variable | | Dependent on Investment Performance<br>e.g., Fixed intervals (qtly, monthly, etc).<br>e.g., Return distribution or capital placed at-risk<br>OR<br><br>Client Designated Performance (RoR, EPS, etc)<br>e.g., reverse negative performance periods<br>e.g., support a "floor" of positive performance<br>OR<br><br>Accrual Pool Balance<br>OR<br><br>Unrelated Metric<br>(e.g., S&P, Russell 2000)<br>OR<br><br>Statistical or Mathematical Transformation of Any of the Above | | Daily<br><br>Weekly<br><br>Monthly<br><br>Etc. |

Risk/Reward Transformation

|  | Before GFT | After GFT | Direction |
|---|---|---|---|
| Annual StdDev | 23.35% | 6.95% | ⬇ |
| Reward/Risk Ratio (Sharpe, no risk free) | 2.07 | 3.52 | ⬆ |
| % Months Positive | 67% | 93% | ⬆ |

| | Benchmark Index | Gemstone Enhanced Benchmark Index | Effective Overlay Contribution | |
|---|---|---|---|---|
| Average Monthly Return | 0.63% | 1.34% | 0.71% | Change in Average Monthly Return |
| Monthly Standard Deviation | 2.49% | 1.76% | -0.73% | Change in Monthly Standard Deviation |
| Avgerage Anualized Return | 7.83% | 17.36% | 9.53% | Change in Average Annualized Return |
| Annualized Standard Deviation | 8.63% | 6.09% | -2.54% | Change in Annualized Standard Deviation |
| Return to Volaitlity Ratio | 0.88 | 2.65 | 202.19% | Percent Change in Return to Volatility Ratio |
| Percent Positive | 55.21% | 98.96% | 79.25% | Percent Change in Percent Positive |
| Minimum Return | -4.77% | -0.35% | -92.65% | Percent Change in Minimum Return |
| Maximum Drawdown | -6.76% | -0.35% | -94.82% | Percent Change in Maximum Drawdown |
| Correlation to Index Return | 1.0000 | 0.9115 | (0.7760) | Correlation to Index Return |

Figure 7

METHOD FOR IMPROVING THE PERFORMANCE AND PERFORMANCE CHARACTERISTICS OF A MANAGED INVESTMENT

CROSS-REFERENCE TO RELATED APPLICATIONS

This application claims the benefit of U.S. Provisional Patent Applications No. 60/467,064 filed May 1, 2003, and No. 60/479,201 filed Jun. 17, 2003, both of which are incorporated herein by reference.

BACKGROUND OF THE INVENTION

1. Field of the Invention

The present invention relates generally to a method for operating a managed investment product and to the managed investment product and, in particular, to a method and product for improving performance and performance characteristics in managed investments that employ incentive or performance based compensation.

2. Description of the Related Art

Traditional or "long only" investing (long term, buy and hold investing) generally involved stocks, bonds or some combination of the two. "Long only" investing has been widely accepted as the preferred method of acquiring prudent investment access, especially among institutional investors. An entire industry has developed to support this type of investing, with a highly evolved framework for the analysis of the proper relative return for a given level of risk. Most investments are easily categorized, and nearly all have a commonly accepted index or benchmark from which to determine success or failure. More recently, "alternative" investments (such as hedge finds, etc.) having very different characteristics and constraints have been making their way into institutional portfolios.

Risk vs. Reward

Today most investors, especially institutional investors, look upon price action or volatility (movements up or down) as the definition of risk. The Capital Asset Pricing Model (CAPM) is a widely accepted model of the relationship between the expected risk of an investment as it influences the expected return. This conceptual framework teaches that in order to realize higher returns, one must accept higher risk. Further, the expected return of an investment, the beta or systematic risk component, is a measurable constant. Beta ($\beta$) is the covariance of an investment relative to others; for example the S&P 500 Stock Index (S&P=Standard & Poor's) has a beta coefficient of 1 while a single stock with a coefficient of 0.5 would be expected to experience half the risk and half the return. Any excess return above that which is expected relative to the amount of risk taken is typically attributable to manager skill and is referred to as alpha ($\alpha$) generation. The simple linear regression $Y=\alpha+\beta X$, where "$\beta$'" defines beta and "$\alpha$" defines alpha is the equation commonly used to ascribe added manager and strategy value relative to other investments. Note that Y is the investment portfolio return, while X is the market return less the risk free rate.

Source of Investment Gains

With traditional investments, the beta portion of performance (the portion attributable to systematic exposure common to all securities of a similar class) of the investment is typically the far more important component as it represents the return generally available from an investment in the marketplace and is the basis for comparison. All similarly focused managers would be expected to provide this return and are measured by how well they do so. On the other hand, the excess return, or "alpha", generated by traditional investment managers is not usually significant in size. Because systematic or market-driven factors make up the most important portion of performance and the contribution attributable to the specific manager's skill is typically marginal, traditional investment managers generally charge a straight fee based on assets under management (e.g. 75 basis points, which equals ¾ of one percent).

These concepts also more generally apply to the performance of return on capital expected by an investor in broad array of financial and contractual relationships where there is both an expected or average performance expectation and the potential for a generated excess return by a compensated manager.

Alternative Investments

In recent years, however, non-traditional or alternative investments have grown in importance. Examples of alternative investments classifications include:

Venture Capital
Private Equity
Global Macro Arbitrage
Relative Value Arbitrage
Event Driven Arbitrage
Managed Futures & Currencies
Real Estate
Natural resources
Entertainment and athletic ventures
Securitizations Some of the distinguishing characteristics associated with alternative investment managers are:

Largely skill-based investment returns
There is a recognized component of alpha-based returns
The ability to buy long or short on the markets traded Performance-Based Incentive Fees An important difference between traditional and alternative investments involves the issue of performance-related compensation. With alternative asset managers, "alpha" is the more important return component. While alternative investment managers also can be compensated based on asset size, a portion of such manager's return is typically tied to the performance of the portfolio. Manager skill in generating absolute returns (or "alpha") is the key determinant in whether the alternative investment manager will succeed or fail. With a source of returns that is quite different than for traditional investments, such managers are also compensated for these returns quite differently. The marketplace has determined that the most appropriate reward for the alternative investment manager is to tie the manager's compensation to the manager's performance—the manager's ability to generate alpha. (The traditional manager, in contrast, is typically paid with a flat fee, as the traditional investment manager's main focus is delivering beta, not alpha.) This performance-based form of compensation benefits both the investor and the manager because both have interests that are aligned. Manager skills that improve performance on an absolute basis (thereby having a positive alpha) are rewarded through manager participation in that performance.

SUMMARY OF THE INVENTION

The invention's improvements in performance and performance characteristics generally apply to the performance of return on capital expected by an investor in a broad array of financial and contractual relationships where there is both an expected or average performance expectation and the potential for a generated excess return by a compensated manager and where the manager is compensated on a performance or incentive basis.

DEFINITIONS

The following definitions will be helpful to a complete understanding of the invention.

Traditional Asset-Based Fee—A fixed fee based on a percentage of the assets managed by a manager (e.g. the normal compensation for a mutual fund manager).

Performance-Based Fee—An incentive fee, or any other form of compensation, based on a percentage of absolute or relative profits generated by a manager.

Drawdown—The difference in dollars between the highest net asset value of the account on a daily basis versus the subsequent lowest daily net asset value realized.

Accrual—That amount owed, but not paid, to a manager at any point in time prior to the termination of the investment.

Accrual Basis—The client and manager's mutually agreed schema to calculate the amount and timing of any amount paid to the Accrual Account. Reverse Accrual—A decrease in the amount owed to a manager in the event the investment suffers losses prior to being terminated.

Reverse Accrual Basis—The client and manager's mutually agreed schema to calculate the amount and timing of any Reverse Accrual drawn from the Accrual Account.

Pre-Funded Accrual Account—Monies put at risk or caused to be put at risk by the manager or managers to absorb any initial losses incurred by the fund during the initiation of management and to further extend the ability to absorb, defer, and reapportion risk related to the investment and to support investment returns. These monies are released to the manager as the accrual account reaches sufficient size to be deemed adequate to cover any expected future losses.

This can include the possibility of a funding source from outside investors as well. This new form of alternative investment in the derivative of negative deviation of incentive-based investment structures through cash or a contingent liability exposure is one highlighted in the examples and one that in combination with the manager's commitment is powerful for underwriters that also could sell the investment pool or take it on for proprietary risk capital.

Accrual Recapture—A system in which accrued funds consumed covering losses or in fulfilling the obligations of the Reverse Accrual Basis including, but not limited to, any Priority Return payments are replenished by recapturing fund's profits until all previously earned (but subsequently expended) funds in the accrual account have been returned to the accrual account, at which time the agreed Asymmetric Performance Fee schedule is followed Hurdle Rate—A minimum return that must be obtained before the manager begins to earn any incentive fee, i.e. to share in the profits.

Accrual Threshold—A previously attained level of investment valuation that must be exceeded before additional performance-based accruals, in the form of incentive fees, can be charged.

Net New Highs—A term referring to the achievement of net investment gains beyond the Accrual Threshold.

Asymmetrical Performance Fee—The rate of accrual exceeding any Accrual Threshold differing from the rate of Reverse Accrual used to cover investor losses and, sometimes the investor's Priority Return based on the Reverse Accrual Basis.

Sharpe Ratio—A risk metric (or measurement) describing the excess return of an investment over the risk-free rate divided by the volatility of the asset(s). The Sharpe Ratio is determined according to the following equation:

$$\text{Sharpe Ratio} = \frac{\text{Return on asset} - \text{risk-free rate}}{\text{volatility of asset}}$$

The Sharpe Ratio (a measure of excess return to total volatility) is regarded as a method of understanding the marginal contribution to performance for an increase or decrease in risk and is one common example of a performance characteristic Sortino Ratio—This metric or measurement of excess return to "bad" volatility, in contrast to the Sharpe Ratio, has as its denominator the downside semi-variance. See the following equation:

$$\text{Sortino Ratio} = \frac{\text{Return on asset} - \text{risk-free rate}}{\text{Downside volatility of asset}}$$

The Sortino Ratio measures only the downside volatility of the asset.

Note that the denominator of the Sharpe and Sortino Ratios is normally comprised of the aggregated price action of the securities in the portfolio. In this instance, the ratios describe the investor's risk experience after application of the various risk dampening methods developed in the following summary. Improvement in these ratios is an example of improved performance characteristics.

Priority Return—A defined minimum positive payout, generally set by the investor, or otherwise agreed by financial arrangement as a specific element of the Reverse Accrual Basis.

Accrual Account—the account to which Performance-based Fees are credited and from which Reversal Accrual transfers are taken. This account's value cannot be less than zero.

Performance Fee—the negotiated rate (which may be constant or variable per some agreed formula) paid by the investor to the manager(s) of the investment, portfolio or other financial arrangement.

Incentive Fee—a portion of the Performance-based Fee paid for successful attainment of financial parameters related to an agreed investment, portfolio or financial arrangement.

Fund of Funds—an investment fund comprising two or more individual funds. Examples include a fund of hedge funds or a fund of managed futures funds and/or managed accounts.

Manager of Managers—a macro-level manager usually serving as the allocator of, among other things, trading positions, risk capital, or other performance-related variable portfolio parameters affecting the net performance of all the individual managers, who are the allocatees. These allocatees may be an individual manager of a fund or individually managed account or of some other form of financial arrangement. Each manager to whom the Manager of Managers allocates usually has contractually agreed to allow the Manager of Managers certain rights to set and adjust various performance parameters affecting the combined net performance of all the individual managers when treated as a single fund. Composite Level, Composite Performance Level, Composite Portfolio Level—the domain or scope of evaluation or analysis dealing with some portion (from some to all) of the net performance or relevant parameter measurement of the constituent elements in an investment, portfolio or financial arrangement, as in, but not limited to, an investor's complete portfolio of assets, the Fund of Funds level of a fund comprising many individual funds, or an enterprise's entire aggregate performance Individual Portfolio, Individual Program, or Fund Manager Level—the domain or scope of evaluation or analysis dealing with an individual constituent part of an investment portfolio or financial arrangement, as in, but not limited to, a single find within a Fund of Funds.

Background Information on Variations in Performance Fee Payment Methods

Many types of investments, both traditional and alternative, now feature performance-based compensation to the manager. Typically, once these fees are actually paid to the manager they are retained by them (regardless of subsequent performance). The Accrual/Reverse Accrual approach, in contrast, not only puts the manager's fee at risk, but delivers a host of other benefits to the investor. The concepts of Accrual and Reverse Accrual afford managers and their investor's with opportunities to transfer, defer, and reapportion both risk and return. One such opportunity recognized by the present inventors consists of exploiting the Accrual/Reverse Accrual process for purposes of enabling a manager to beneficially reduce an investor's experienced volatility on their portfolio as a whole and to transform the pattern of recognized return from an underlying investment or investments. It would be a benefit to all financial relationships where increased performance or improved characteristics of performance on investment are desired and which utilize performance-based compensation to identify those necessary components of the process that would be involved. Concepts which additionally will help to understand the present invention include:

Fractional Payment Accrual with Rolling Carry-Forwards—By paying out incentive fee accruals with regularity, yet on a fractional basis to the manager, a significant portion of the set aside (Accrual) is available to the investor as an offset to any future obligation payments under the Reverse Accrual Basis. This type of draw from of the Accrual Account is referred to as Reverse Accrual and is available to the investor in accordance with the terms governing the Reverse Accrual Basis (until the entire Accrual Account is exhausted).

This Fractional Payment Accrual with Rolling Carry Forward payout method will enable other components of the invention greater ability to improve investor performance characteristics. The cushioning effect to investor returns that is associated with this incentive accrual account method has been recognized by the inventors as a means to lower the investor risk exposure for a given return or to raise the return while holding risk constant or, more generally, to transform the magnitude and recognition of the returns to the advantage of the investor. Asymmetrical Performance Fee Accrual—An asymmetric performance fee accrual practice describes a method of retaining unpaid but accrued Performance-Based Fees to provide a cushion for future Reverse Accruals. A percentage of losses (up to 100% of the Accrual Account) are paid from the Accrual Account in accordance with the Reverse Accrual Basis. The manager's performance Accrual Account will temporally absorb losses or adverse valuations to the investor's reverse accrual basis in the investment until it is zeroed out. The asymmetric component (in the event of negative performance) provides investors with a substantial and material improvement in their performance characteristics. The manager has priority in the recovery of the fee Accruals that were previously reversed when they are regenerated from subsequent positive performance, which may have the effect of again lowering investor volatility—although this time it is a reduction in upside (positive) volatility.

The benefit of this continuous accrual and reverse accrual method is also the dampening of investor price volatility or risk by transferring a portion of the risk or volatility from the investor to the manager, thereby dissociating that risk in time from the variations in returns native to the manager's raw returns on capital and subsequently reapportioning risk and cash flows to enhance investor performance characteristics Investor Benefits The present invention provides improved performance and performance characteristics for an investment, as broadly defined herein. One of the performance characteristics may be a reduced risk for the investor. Additional mechanisms for reducing investor risk that are not yet known or available in the marketplace are also provided. The following describes the methods for achieving the goal of lowering or transforming investor volatility, causing materially improved performance characteristics while raising the Sharpe and Sortino Ratios achieved for a given level of alpha production.

In one embodiment, the invention provides a method to materially improve investor performance characteristics through the implementation of a financial technology and in another aspect offers a product utilizing the method. This invention will directly benefit any investment or financial relationship that utilizes Performance-Based Fees that are all or part of the manager compensation. The present invention will further benefit any investment by any person or entity that can directly or indirectly invest in a portfolio that utilizes Performance-Based Fees or the services of a manager that receives part or all of its compensation from Performance-Based Fees. These improved performance characteristics may be realized on the actual invested capital or financial commitment, the existing portfolio of capital, assets, or credit presentations or the enterprise level financial results to which the investment may be linked.

This goal of improving performance characteristics through the implementation of the inventive method is achieved through the implementation of the following risk tools used either individually or in combination with each other. Building on the use of Fractional Payments, although with a continuous Accrual carry forward and Asymmetrical Accrual, the tools of a preferred embodiment of the invention are:

On an Individual Portfolio level, also termed a Program level:

Long Term Calculation Cycle & Fractional Payments

High Frequency Performance Fee Calculation

Layered Performance Fee Schedule

Client Chosen Accrual Basis

Priority Investor Return

Pre-Funded Initial Accrual Account

On a Composite Portfolio level:

Extending the inventive method to the Composite Performance Level via an Individual Portfolio Extending the method of the invention to the Composite Performance Level via Multiple Portfolios Extending the method of the invention to the Composite Performance Level from the Manager-of-Managers (MoM) or Fund Manager Level Extending the method of the invention to the composite performance level of a holding or portfolio of tangible assets such as real estate, commodities and natural resources.

On a third party level:
Extending the method of the invention to the Return of a third party portfolio (e.g. one over which the manager subjecting itself to this special fee structure may not have any control)
Extending the method of the invention to the Return of a Published Financial Index
Extending the method of the invention to the Return of a Specific Business Risk Measures
Extending the method of the invention to capital investments or committed to personnel.
Extending the method of the invention to Specific Business Metrics

BRIEF DESCRIPTION OF THE DRAWINGS

Specific examples for the application of the present method are set forth in the drawings.

DETAILED DESCRIPTION OF THE PREFERRED EMBODIMENTS

The principles of the present invention are more fully understood by consideration of the following detailed description. The following provides that an investor or group of investors has retained a manager or group of managers (also referred to as an advisor) to invest money (or capital or credit) on their behalf in one or more investments with the intention of seeking an increase in value of the investment. The investment or investments are also referred to as a return generator. The skills of the manager or managers are used to achieve this increase in value. The manager receives compensation as a percentage of the increase in value of the investment according to the agreement with the investor or investors. For example, the manager may receive 20% of the increased value, although other amounts are of course possible. This percentage is the Performance-Based Fee. Here, the fee is paid into or credited to an accrual account. If the investment or investments decline in value, funds are withdrawn from or taken from the accrual account and returned to the investment or investments. This is the reverse accrual.

With regard to the present invention, the term investment may include a single investment or a plurality of investments which among others may include cash, liquid assets, illiquid assets pledged or otherwise collateralized, credit, or general obligation of the investor(s). The term manager may include a person, a plurality of people, a company or a plurality of companies otherwise compensated for creating value on the investment through a financial relationship which in whole or in part utilizes performance or incentive based compensation. The percentages and amounts discussed herein are for example only, and other amounts and percentages are encompassed within the scope of this invention.

The benefits provided by the invention are available on several levels, as follows:

On an Individual Program level:

Long Term Calculation Cycle & Fractional Payments

Generally, Performance-Based Fees are paid in full at the end of a specific time cycle, most commonly quarterly or annually. Current practice is that, once actually paid, the fee is retained by the manager. The present inventors have recognized that if one pays out the Performance Fee too frequently, there is a high probability that there will be no accrual fee available for Reverse Accrual should the investment suffer losses. Therefore, the calculation and carry forward cycle must be extended much longer than in current practice. According to the invention, the calculation period may be a year or more, and even as long as 60 months.

In one embodiment, the calculation for the payout is made from inception to the present, so each calculation is made over an increasingly long period of time. This provides a calculation of the return generated by the investment over the life of the investment rather than over some shorter interval. Further, the first payment may be delayed for some time, such as a year or more after inception, to ensure that finds are available for the reverse accrual payment.

According to one aspect, Fractional Payments from the accrual account to the manager or managers are used. The Fractional Payment is a portion, for example, $\frac{1}{12}$ of the amount in due to the manager or managers. The remaining balance on the accrual account is carried forward. Thus, the Accrual Account is not fully depleted by the payments to the manager out of the Accrual Account. In a preferred embodiment, the Fractional Payment of Performance-Based Fees are extended beyond a 12-month (one year) calculation cycle.

Increasing and maintaining the Performance Fee Accrual Account as funds are available for Reverse Accrual has significant investor benefit and results in a meaningful increase in the Sharpe and Sortino ratios. This account is augmented by extending the length of the calculation cycle. In applications that will be subsequently illustrated, significant long term calculation cycles often measured in multiple years (regardless of the time cycle for calculation) provide significant accrual carry forward benefits that can materially impact the investor return profile.

It should be noted that the Fractional Payments made from the Accrual Account are at a percentage, such as 25%, whereas the Reverse Accruals for declines are made at an independent rate or function When the investment increases in value after a decline, the payments or credits into the Accrual Account for the increase are made until the previous accrual threshold is reached. After that, for increases above the previous accrual threshold, referred to as the Net New High, the Fractional Payments again take effect to provide for a 25% withdrawal, for example, payment from the Accrual Account to the manager or managers.

High Frequency Performance Fee Calculation

Performance-Based Fees can be calculated and accrued at any time frequency or by an event trigger dissociated from time. These are the fees that are paid into the accrual account, as opposed to the fees that are paid from the accrual account to the manager or managers, as noted above. For some investments that have daily transparency and liquidity, Performance Fees are preferably accrued (or reverse accrued) on a daily basis. For example, a manager with a 20% Performance-Based Fee may calculate 20% of each period's Net New High Profits and add those to the Accrual Account.

The calculation and payment of Performance-Based Fees for a high-frequency cycle (e.g. daily) can significantly alter the risk-return profile of the underlying investment. In combination with a Long Term Calculation/Carry Forward Cycle for the payments out of the Accrual Account to the manager or managers, one achieves materially improved performance characteristics.

Layered Performance Fee Schedule

A significant part of lowering the risk of an investment is tied to reducing the large financial shocks often referred to as the "fat tails" of an investment's distribution of expected returns. Performance Fees may be paid as a fixed percentage of the Net New High profit of an investment (e.g. 25% of the Net New High profits). Sometimes a return threshold can also be applied (such as the 3-month treasury bill return) before the start of the calculation of the Performance Fee (e.g. 25% of the Net New High profits in excess of the 3-month treasury bill rate over the corresponding period). This provides a hurdle above which the increase in value of the investment must reach to begin the calculation of the Performance-Based Fee.

Performance Fee calculations within this invention can be "layered" to substantially reduce portfolio volatility and meaningfully increase the Sharpe and Sortino ratios. Specifically, instead of a flat 25% of the Net New High profits, the fee is calculated (assuming a monthly cycle) as:

| Range of Net Monthly Return | Performance Fee Schedule |
|---|---|
| 0%-2% | 20% |
| 2%-3% | 40% |
| Above 3% | 60% |

Because a large incentive is paid on the largest return months, the return to investor decreases significantly for those periods thus reducing the volatility of the return cycle.

This substantial reduction in volatility during periods with positive returns in combination with an Asymmetrical Performance Fee Payment application can reduce the overall investor risk/return and again materially improve an investor's experienced performance characteristics.

Client Negotiated Reverse Accrual Basis

An example of an Asymmetrical Performance Fee is to use Reverse Accrual to cover 100% of the loss in a given period. It is a much more powerful concept to have a client negotiated/client chosen Asymmetrical Performance Fee. It may be, for example, that one would desire to protect against a loss in any given period of more than a specific amount, or one may desire to cut the loss potential in half.

Priority Return to the Investor

As noted earlier, the manager practice of beginning the Performance Fee calculation after a specific threshold has been met is common. An advantage over that practice is to utilize performance fees in accordance with a negotiated Reverse Accrual Basis.

Providing for a Priority Return significantly improves the Sharpe and Sortino ratios and other performance characteristics of an investment by narrowing the distribution return profile. For example, suppose an investment manager had a carry forward accrual equal to 10% of the investment size and the Priority Investor Return was equal to 2% per month. In the event of a 1% loss on the investment in a given month, 1% would be taken from the accrual account to cover the loss and 2% would be taken from the accrual account to provide the investor the 2% Priority Return. Thus, the net investor return that would have been a negative 1% (under most traditional Performance-Based Fee payment schedules) would actually result in a positive 2% return month utilizing the Priority Investor Return calculation method. Clearly, the application of Priority Investor Return technology aligns the manager with the objectives of the investor.

Pre-Funded Accrual Account

There is no volatility transfer or reapportionment nor return support possible without an Accrual pool that is "at risk". Having an Accrual account available to cover losses and provide a Priority Investor Return is dependent on the positive performance of a portfolio over a time horizon sufficient to achieve a "mature" accrual balance. Even under the best of conditions, this could take months, if not years.

A solution offered by embodiments of this invention is to find the Accrual Account in advance of the start of trading. A Pre-Funded Accrual Account provides for significant performance characteristic improvement by immediately increasing the power of accrual balances to serve the goals of improved characteristics throughout the term of the investment. A Pre-Funded Accrual Account still aligns the investor, the manager and potential risk capital interest while providing the benefit.

On a Composite Portfolio Level:

While the method can provide dramatic improvement to the Sharpe Ratio of an individual portfolio or program, often by 400% or more, extending the method to the portfolio level produces similar dramatic risk control improvement.

Extending to Composite Portfolio Level

Embodiments of the invention which are used at the Composite Performance Level via the Return of an Individual Portfolio have further advantages.

If one manager or portfolio investment utilizes the present method to reduce risk and that portfolio is one of two or more in a Fund of Fund investment or multi-manager investment portfolio, the Accrual Account can be utilized to improve the performance characteristics of the entire composite portfolio. For example, as described above the Accrual Account is utilized to cover the losses of the manager (Asymmetrical Performance Fee Accrual) and provide a Priority Investor Return. By extending the method to the composite level, the Performance Fee Accrual of the individual portfolio is used first to cover the losses of and provide a Priority Return for the FoF (Fund of Funds) or multi-manager portfolio composite performance.

Embodiments of the invention applied to the Composite Performance Level via multiple portfolios also have advantages.

Just as it is possible for an individual manager to extend the present method to a Composite Portfolio Level, it is also possible for two of more managers to extend the method to one another or in combination to a composite level.

Extending the method to the Composite Performance Level from the Manager of Managers (MoM) or Fund Manager Level has benefits as well.

Often in portfolios involving two or more managers or funds, there is a MoM (Manager of Managers) or Fund Advisor who receives a Performance Fee for portfolio management services. As with individual managers, this Performance Fee is tied to the performance of the composite multi-manager or Fund of Fund performance.

Just as it is possible for an individual manager to extend the method to a Composite Portfolio Level, and for a combination of managers to extend the principles of the present invention to one another or in combination to a composite level, it is also possible for a Manager of Managers to extend the method at the Composite Performance Level.

Pre-Funded Accrual on a Manager-of-Managers/Fund-of-Funds Level

Specifically, a Manager of Managers according to the invention offers a Pre-Funded Accrual Account. In order to sustain the Accrual Account, the Manager of Managers utilize the present method by employing a Long Term Calculation/Carry Forward Cycle, a High Frequency Performance Fee Calculation and a Layered Performance Fee Schedule. Then, on an investor-negotiated basis, the Manager of Managers provides for a Priority Investor Return and an Asymmetrical Performance Fee schedule.

On a Third Party Portfolio Level:

The flexibility of the present method is clearly seen in a Third Party Portfolio application. The potential for application is broad. Selected examples follow.

Extending the method application to the Return of a Third Party portfolio is described below.

A Third Party portfolio can take many forms. Some examples might include: a single global macro hedge fund; a FoF (a Fund of Funds) of various hedge fund styles; a multi-asset fund involving both traditional and alternative assets; or more broadly assets (liquid or illiquid, tangible or intangible) which serve as reservoirs of financial value that can be invested for improved performance or improved performance characteristics. In every case, the Third Party can invest in a portfolio that involves Performance Fee compensation on the Manager level (or the MoM level). In a similar manner as described with regard to extending the method of the invention to the Composite Performance Level from the Manager of Managers or individual Fund Manager Level above, the method can be applied to the independent third party portfolio.

As an example: Suppose a global macro hedge fund, (that is, a hedge find trading in one or more of a broadly diversified set of asset classes) invests excess capital in a multi-manager managed futures portfolio that paid a Performance Fee on the Manager of Managers level. Then, on an investor-negotiated basis, the Manager of Managers of the managed futures portfolio could provide according to the invention for a Priority Investor Return and an Asymmetrical Performance Fee schedule. As in previous examples, this substantial reduction of the volatility of periods with positive returns in accordance with the applicable Reverse Accrual Basis significantly reduces the net volatility of a portfolio.

Return of a Published Financial Index

The method of the invention in further embodiments are applied to the return of a published financial index.

Many investors target specific returns measured against a financial index. The return of the index is often treated as the beta of the portfolio and any excess return as the alpha return. As such, there is significant benefit in outperforming the chosen index on a consistent basis. The present method can significantly enhance the potential for a portfolio outperforming a chosen index.

Suppose, for example, that the investor is mandated to outperform the S&P 500 Index. To do so the investor invests in a number of managers (or funds or FoFs) chosen to provide alpha in excess of the index. Because of the managers' mandates, the "core" investments would likely have a significant correlation to the chosen index and, as such, are likely to have losing months that correspond to the index's losing months. If a separate investment is made in an independent portfolio that employs techniques of the present invention, the Performance Fee Accrual is applied to cover losses in proportion to those of the chosen index, in this example the S&P 500. As such, diversification is provided by an inventive portfolio income stream that is unlikely to be correlated to the other managers' returns. Likewise, with the use of this application of the method, any additional losses sustained by the incentive accrual and the appropriate Priority Return are drawn against the portfolio incentive fee Accrual. Once again, manager alignment with investor interests is achieved.

The present invention is applicable to any published index or any privately defined index customized to specific investor risk needs.

Improving Performance Characteristics by Improving or Hedging Specific Business Risk Measures Extending the present method to hedging specific business risk measures is set forth in the following.

Businesses have business-specific risks. For example, the airline industry has a defined risk tied to the cost of jet fuel. If the business defines its specific risk in terms of a suitable index (perhaps tied to the price of a commodity like fuel oil), and a separate investment is made in an independent portfolio that employs the present techniques, the Priority Performance Fee Accrual is applicable to cover losses as defined by the specific business risk, in this example jet fuel costs. As such, the losses and the appropriate Priority Return are covered by a draw against the inventive portfolio Incentive Fee accrual.

It is important to note that the Performance Fee accrual has been earned by the manager and, as such, has been appropriately deducted for the new revenues from the investment performance. Conversely, if a loss is suffered as defined by the specific business risk, for example an increase in the cost of jet fuel, a Reverse Accrual of the manager Performance Fee Accrual Account decreases the amount actually owed the manager and, as such, hedges the loss incurred by the business risk.

Specific Business Metrics

The present method may be extended to specific business metrics.

Businesses often have a standard by which they are measured. Perhaps it is important that they have continuously positive quarterly earnings or that they do not sustain a loss of more than a specific threshold. If it is critical to meet specific business metrics, a separate investment can be made in an independent portfolio that employs the present techniques tied to the specific metric. For example, if it is important to not sustain a quarterly loss, the Reverse Accrual Basis causes a Reverse Accrual sufficient to bring the company's quarterly performance into positive territory.

Generalized Schema of the Application of the Present Method

As previously described, the benefits of the present invention include material improvements to investor metrics (both raw rate of return improvement and/or risk-adjusted measures of return such as Sharpe and Sortino ratios) as well as conveying substantial investor benefit through the customizable risk transference and reapportionment from the client to the investment manager(s). Additionally, the present invention can employ novel finding mechanisms that make products structured according to the principles of the invention to be more accessible to interested investors (for example, collateralized investments that eliminate the need for up-front cash) and even the introduction a new alternative investment vehicle (in the form of pre-funded levels available for Reverse Accrual as described in Example 4 in the following).

Figure 1:
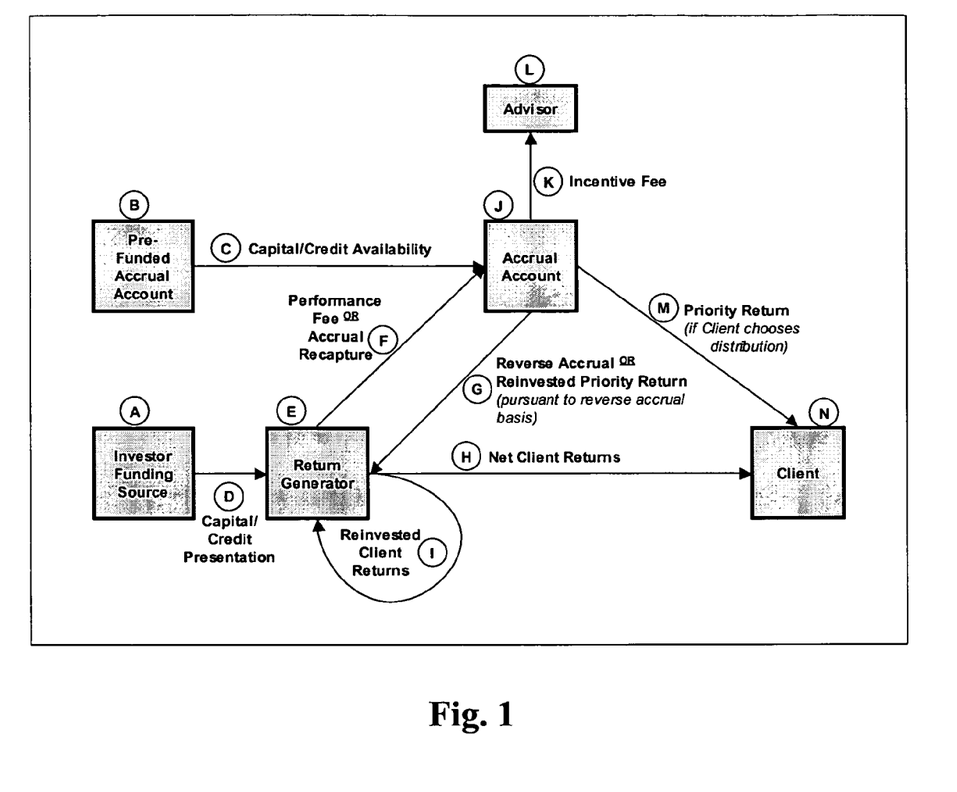
FIG. 1 is a block diagram showing an overview of the present invention, the interrelationship of its components and areas of computerized calculation

Most notable is the flexibility and range of customization within the present structure. Of particular note is the unique combination and/or layering of variables available to determine both the size and timing of the Incentive Fee Accrual and Reverse Accrual payments. These processes are represented by letters "F" and "M" in the FIG. 1. FIG. 1 shows the general framework of the inventive method.

With reference to the drawings, in FIG. 1 in particular the investor funding source A provides capital and/or credit for presentation D to a return generator E. The investor funding source A may be an individual, institution, group of investors, etc. The return generator E is the investment into which the capital or credit D is applied. The aim is to cause an increase in valuation of the capital or credit D. The return generator E generates returns and may provide the net returns to the client N as indicated at H. The returns may also be reinvested in the return generator E as indicated at I. Of course, the returns may be negative as well a positive and it is the positive returns that are shown as being provided to the client at H or reinvested at I. The negative return is a decrease in valuation of the capital or credit D supplied by the investor finding source A.

The performance of the return generator E (changes in valuation) yields a performance fee, which is forwarded at F to an accrual account J. The performance fee is an amount of the increase, for example, of the valuation of the return generator E. In one example, the performance fee is a fixed percentage while in another example it is a variable percentage determined by the level of increase of the return generator E. By way of example, if the return generator E increases in value by $100 over an accrual calculation period and the performance fee is 25%, then $25 is paid to the accrual account. The tracking of valuation changes of the return generator E is preferably done by a computer system and the performance fee calculation is also carried out on the computer system, or on a different computer system.

It is within the scope of this invention to provide a performance fee based on some relative performance of the investment, rather than on an absolute performance value. For example, the agreement between the investor and the manager may be to pay the incentive fee if the investment beats the S&P 500 index by 300 points, regardless of whether this results in the investment having a decrease in value from the initial value. The fee is thus determined relative to the S&P 500 index. Of course, other amounts and other bases for the relative performance determination may be made. An absolute incentive fee payment calculation is relative to the value of the investment, such as relative to the initial value of the investment. The absolute fee calculation is thus a special case of the relative fee calculation. The absolute fee calculation is made based on a net increase in the value of the investment. It is also possible to provide an offset, or hurdle, over which the value must reach before the performance fee is paid. For example, the hurdle may be that the investment must increase by 2% before the performance fee is paid.

The accrual account has been pre-funded B by capital and/or credit availability C. The pre-funding source may be the advisor (or manager) L or some other source. The accrual account J provides a reverse accrual G for negative performance of the return generator E. In the example, if the return generator E experiences a negative performance of $100, then $25 (for a 25% performance fee) is withdrawn from the accrual account and returned to the return generator E. Other percentages, or other calculations on a different basis, are possible for the reverse accrual. The reverse accrual calculation in most cases will be based on the performance of the same investment as the calculation of the performance fee, although in some embodiments of the present method the basis for the two calculations may differ. The reverse accrual may be calculated on a different basis than the investment being managed by the manager. The reverse accrual can be calculated on a basis of choice by the investor and the manager.

If the performance of the return generator E goes positive, or if the basis for the reverse accrual calculation goes positive, after a negative performance, there is an accrual recapture F to the accrual account J. In the example, a $100 increase of the value of the return generator after the negative performance results in a $25 payment into the accrual account (actually a return of the previously paid $25).

If the client N chooses a distribution of the funds, an amount is drawn from the accrual account J as a priority return M. There may also be a reinvestment priority return G from the accrual account J to the return generator E.

An incentive fee K is provided to the advisor L from the accrual account J. The incentive fee, also termed a performance fee, is preferably a percentage of the amount in the accrual account. In one example, the performance fee is 1/24th the amount in the accrual account, while in another example it is 1/60th. This is referred to as factional payouts.

With regard to fractional payout lengths and incentive levels, it is believed that each will be best fit to the program/portfolio under consideration. The degree and frequency of outlier performance (an atypical performance—either higher or lower than normal), the length of performance cycles for the style and markets, and the reverse accrual terms of the reserve will all be factors in the most logical choice of schedules. The degree of nonlinearity will especially be effected. Averages may be frequency weighted to permit comparison across advisors (managers). The weighted average may be used as a metric according to negotiated terms. The calculations to carry out the steps of the present method are performed on computers or computer systems. Account information and account balances are also determined and stored on computer systems. Tangible payments are made routinely and are determined and stored on computer systems. The monitoring of investment performance, and the payments and withdrawals are in a preferred embodiment carried out using the computer systems, linked by networks, such as LANs, WANs, the Internet, or other interconnected computers. The networks may utilize wired and wireless connections for the preferably secure communications. One or more of the blocks in FIG. 1 may represent computers. It is even possible that all of the blocks of FIG. 1 are computers.

Figure 2:
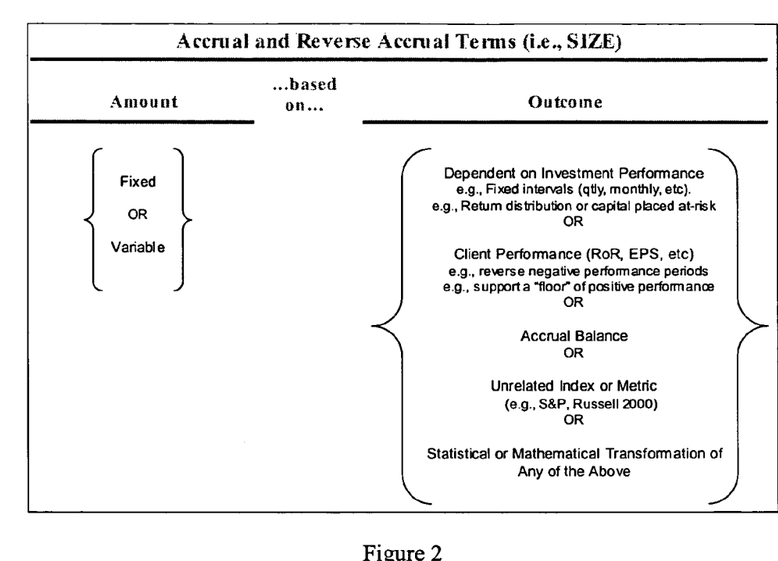
FIG. 2 is a table showing one example of accrual and Reverse Accrual terms based on the monthly rate of return on the investment.

In FIG. 2 is an illustration of the range of options available to determine the size of the Incentive Fee Accrual ("F") and the Reverse Accrual payment ("M") processes. The amounts of the accrual payments and reverse accrual payments may be fixed or may be variable. The payments may be based on the performance of the investment or the performance of the client or on the accrual account balance or on an unrelated (third party) index or metric or on a statistical or mathematical transformation of any of the foregoing.

Figure 3:
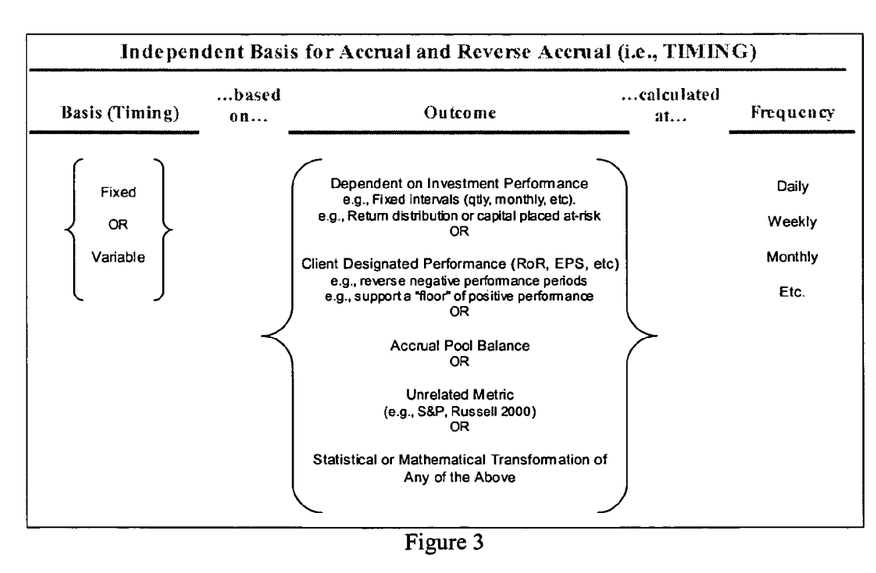
FIG. 3 is a table showing the independent basis for accrual and Reverse Accrual.

FIG. 3 provides shows the basis for timing of the Accrual and Reverse Accrual payments. The periods for calculation of the accrual or reverse accrual payments may be daily, weekly, monthly, or otherwise.

Figure 4:
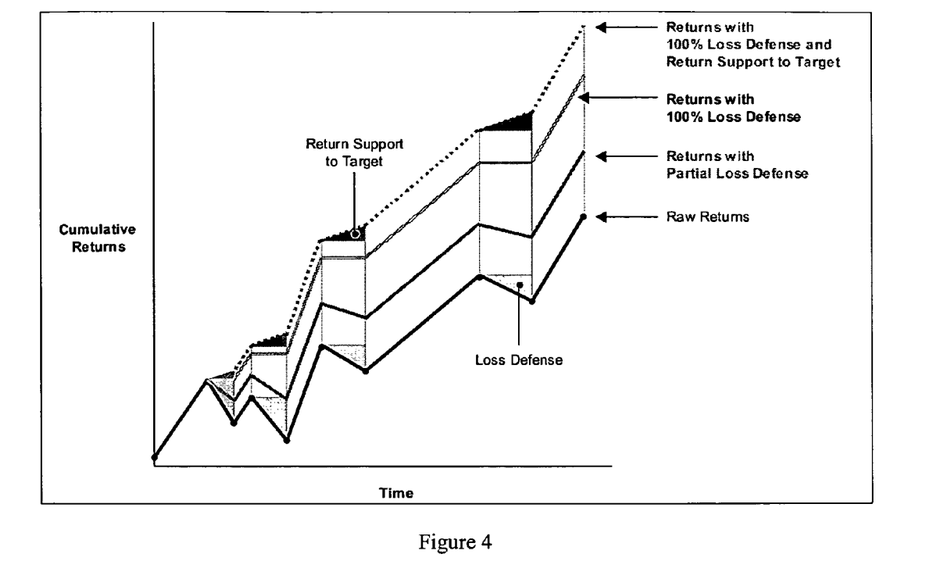
FIG. 4 is a graph showing the comparative returns with the present invention and other plans.

According to FIG. 4, a generalized example return series of an investment structure or client designated accrual basis index shows successive levels of increased investor benefit through the application of the present method. This diagram shows the range of partial return augmentation through a higher level of application seeking to not only offset periods of negative performance, but also to maintain a "floor" of positive performance. The present invention seeks to achieve these goals with the following parameters:

- Timing of Reverse Accrual payment occur on an as-needed basis (i.e. whenever the advisor's portfolio experiences negative performance or more generally when a client customized accrual basis was triggered.),
- Size of the Reverse Accrual payment is also need-based (i.e., assuming availability of Reverse Accrual funds, the client's payment will equal whatever is required to satisfy the client's predetermined contracted size for return support).

Example 1

Application to a Standalone Investment Structure Demonstrating Material Improvement in Risk-Adjusted Measures of Return When the present method is applied to a standalone investment vehicle, the Reverse Accrual structure dampens investment's volatility and improves risk-adjusted measures of return. This application of the concepts according to the present method may be of interest to incentive-based managers, incentive-based compensation structures or other financial relationships utilizing incentive-based compensation across all styles seeking to improve the performance or performance characteristics of an investment In one example of the present method, the improvements of the present invention are applied to financial offerings by a manager (or to a manager of managers such as in a fund of funds) to improve investment offerings or to create a new investment product. A scenario analysis of an example standalone structure of the present method driven by an example incentive-based alternative investment management return stream yielded the performance measures shown in FIG. 5.

Figure 5:
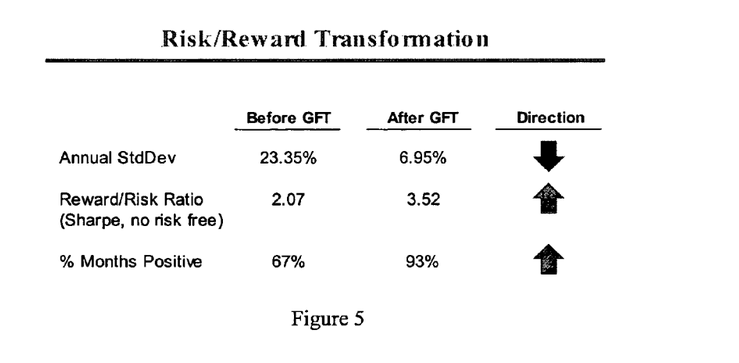
FIG. 5 is a table showing the risk and reward values for one example of the present invention (indicated as GFT)

As example of FIG. 5 clearly shows, volatility (as measured by standard deviation) was less than ⅓rd of the prior level, risk-adjusted returns (as measured by reward/risk) increased by 70% (from 2.07 to 3.52), and consistency (as measured by the incidence of positive months) increased from 67% to 93%.

Example 2

Figure 6:
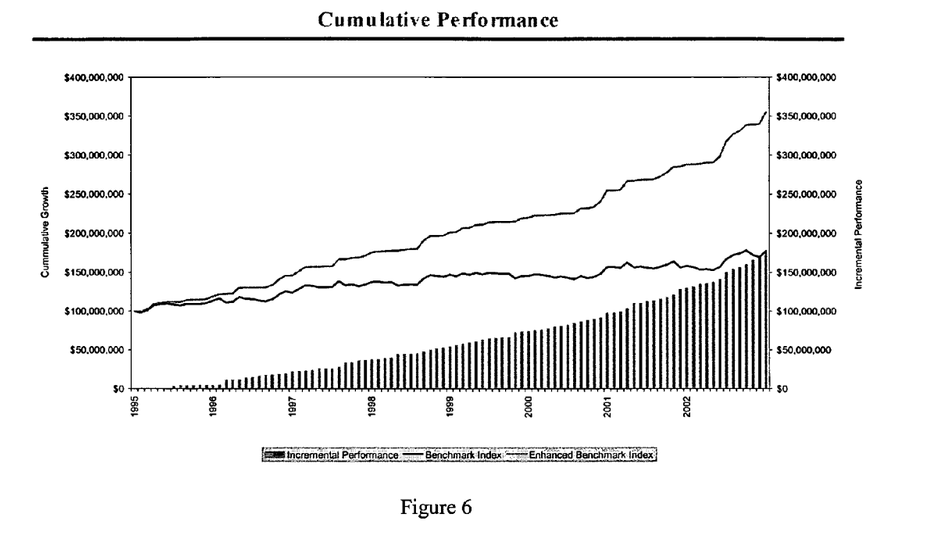
FIG. 6 is a graph of the cumulative performance of investments according to the invention.

Application Through a Linked Structure Provides Material Improvements to Client's Portfolio or Investment Product The present invention's ability to retrospectively assess the Reverse Accrual Basis to then calculate and allocate precise amounts of returns to a client's portfolio can lead to dramatic improvements to the client's portfolio's returns. Scenario analysis of an investment vehicle according the present principles overlaid onto a sample client's return stream yielded the results shown in FIG. 6.

Figure 7:
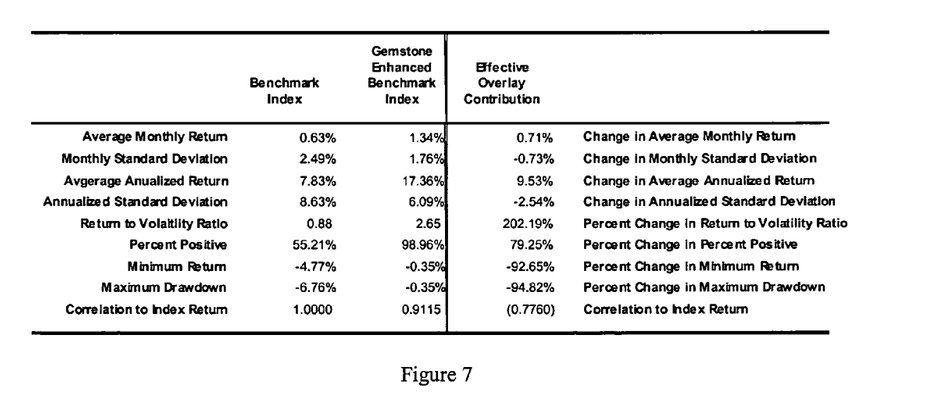
FIG. 7 is a table which shows the enhanced performance with the present invention (indicated as Gemstone) and the effective overlay contribution.

As shown in the example of FIG. 7, the client's "benchmark" returns were enhanced significantly across all measures studied. Average annual returns improved almost 10% per annum (7.83% to 17.36%), volatility as measured by standard deviation dropping from 2.49% down to 1.76%. Similarly, there were more consistently positive months, and drawdown amounts were minimized.

Example 3

Application to Non-Primary Investment Entities Demonstrating Extent of Present Invention's Reverse Accrual Basis and Funding Flexibility Corporate clients as one of many potential examples may choose to employ the present invention's structure in order to hedge against periods of negative earnings performance. Moreover, some corporations may be able to employ a funding mechanism permitting them to fund their investment according to the present principles by pledging illiquid assets or by providing a general credit presentation, eliminating the need for any cash outlay in exchange for potential economic benefits of increased profitability and customized risk defeasance.

Such a structure would be particularly applicable for firms possessing natural resources or substantial under-utilized credit resources. For example, crude oil producers could pledge proven reserves as collateral, mining concerns could pledge metal inventories. The key to this structure is that the firm possess assets with recognizable value that would be committed or otherwise collateralized.

Such a structure would also be particularly applicable for firms with large individual or in aggregate commitments to incentive-based compensation to employees or contractors whose material improvements in performance characteristics of financial commitments would be desired utilizing the inventions concepts and methods.

Because corporations would likely wish to structure their investment according to the present principles to generate Reverse Accrual payments during periods of poor earnings, Reverse Accrual triggers could be linked to predetermined earnings per share metrics, or (if the firm's stock had a particularly high equity market Beta) the firm may wish Reverse Accrual payments to be tied to an index like the S&P 500. Financial institutions, for example, may want to link the payments under the present plan to yield curve metric triggers. Regarding the timing of these payments, it's likely corporate clients would want to link settlement periods to their regular quarterly earnings calendar requirements.

Example 4

Application Highlighting the Present Method's Creation of New Form of Alternative Investment Opportunity for Capital Placement One of the foundations of the present method is the efficient utilization of accrued but unpaid Performance-Based Fees to improve investor benefit through more efficient asset utilization (whether investment is actual cash, credit, or business risk exposure). Also utilized are the key investor benefits of a pure improvement in risk-adjusted returns and customized risk transference, or a combination of both. The delivery of such benefits, afforded by the application of the present technology, can be further enhanced by the Pre-Funded Accrual Account available for Reverse Accrual. Investors offering such capital-at-risk would in turn negotiate an economic return for the acceptance of such risk, forming a new class of alternative investment derivative from the structuring characteristics of incentive or Performance-Based Fee investment structures utilizing the present invention.

For example, an underwriter may offer for sale a closed end security that provides for Performance-Based Fee management strategies utilizing the present invention. This security offering could be further enhanced by having a risk capital pool pre-fund the at-risk Reverse Accrual pool, providing substantial and material initial benefit to the investor in exchange for an acceptable economic return to the capital provider at risk.

The present invention has been described with respect to a method. A financial services product embodying the foregoing is also encompassed within the present invention.

Thus, there are three generalized areas of protection some of which overlap with aspects described. The invention provides a new flexible financial structuring technology that provides for improved investor metrics (consistency, Sharpe ratio), allows customized risk transference (through overlay can specifically mitigate portfolio, asset class, or business risks), and can be structured to use actual investable assets, illiquid assets, or even a pure credit exposure. In addition to some of the aspects already described, several more are provided by the invention. For example, Independent Client and Manager Negotiated Reverse Accrual Basis. This has of course, been traditionally thought of only in terms of the provider's unmodified return series. Examples of possible negotiated basis:
  unmodified return set
  client's investment product returns
  published financial index
  private financial index or portfolio returns
  business specific risk measures (e.g. duration or yield curve risks to banking or savings and loan industries)
  business revenue stream, cash flow, net operating revenue.
  Value of an asset, group of assets, or commodities
  various functions and thresholds (including constant, linear, nonlinear, statistical) Examples of possible negotiated Reverse Accrual Basis include:
    100% Reverse Accrual to 0% net return to accrual basis
    100% Reverse Accrual to Priority Return
    tiers or nonlinear formulaic rates of Reverse Accrual to basis
    statistical thresholding (e.g. engaged when basis is greater than one sigma negative in comparison to the value of the portfolio or corporate performance)

New form of risk capital basis for investment created by the inventive method in providing support to the Accrued Account in exchange for an investment return. Such form of investment could be cash or contingent liability credit support.

Although other modifications and changes may be suggested by those skilled in the art, it is the intention of the inventors to embody within the patent warranted hereon all changes and modifications as reasonably and properly come within the scope of their contribution to the art.

We claim:

1. A method for improving performance characteristics of an investment, comprising the steps of:
   managing the investment on behalf of an investor, said managing step being carried out by a manager, said managing step resulting in changes in value of the investment;
   monitoring performance of the investment by a computer system;
   calculating a performance fee in the computer system, said performance fee being based at least in part on changes in value of the investment over an accrual calculation period;
   applying the performance fee calculated in said calculating step to an accrual account, said performance fee being applied for relative positive changes in value of the investment;
   applying a reverse accrual payment from the accrual account to the investment for relative negative changes in value of the investment over said accrual calculation period so that relative negative changes are offset by the reverse accrual payment to the investor resulting in a transfer of risk from the investor to the manager, said reverse accrual payment being limited to an amount in the accrual account, said reverse accrual payment being executed by the computer system;
   calculating a compensation for the manager for a predetermined period using a computer system, said compensation being a fractional portion of an amount in the accrual account;
   paying to the manager the compensation calculated in said calculating said compensation step;
   carrying forward any remaining balance of the accrual account to provide a cushion for future reverse accrual payments; and
   periodically repeating said steps of monitoring, calculating said performance fee, applying said performance fee, applying said reverse accrual payment, calculating said compensation, paying, and carrying forward any remaining balance.

2. A method as claimed in claim 1, wherein said investment is a composite portfolio of investments.

3. A method as claimed in claim 1, wherein said investment is third party portfolio of investments.

4. A method as claimed in claim 1, wherein said investment is an alternative investment.

5. A method as claimed in claim 1, wherein said investment is an investment selected from the group consisting of: an asset, a pledge of securities and a form of compensation.

6. A method as claimed in claim 1, further comprising the step of:
   pre-funding the accrual account by the manager for absorbing any initial losses by the investment during the initiation of management, wherein money used to ire-fund the accrual account is released to the manager as the accrual account reaches sufficient size to be deemed adequate to cover any expected future loss.

7. A method as claimed in claim 1, further comprising the step of:
   providing a layered performance fee schedule including different fees for different levels of performance.

8. A method as claimed in claim 1, further comprising the step of:
   providing priority investor return.

9. A method as claimed in claim 1, wherein the investment is a portfolio of investments and said step of calculating the performance fee is based on a net change in value of the portfolio of investments.

10. A method as claimed in claim 1, wherein the investment is a plurality of portfolios of investments and said step of calculating the performance fee is based on a net change in value of the plurality of portfolios of investments.

11. A method as claimed in claim 1, wherein the manager is a fund manager and said step of calculating the performance fee is based on performance of a plurality of investments managed by the fund manager.

12. A method as claimed in claim 1, wherein said step of calculating the performance fee is based on performance of a third party portfolio.

13. A method as claimed in claim 1, wherein said step of calculating the performance fee is based on performance of a published financial index.

14. A method as claimed in claim 1, wherein said step of calculating the performance fee is based on performance of business risk measures.

15. A method as claimed in claim 1, wherein said step of calculating the performance fee is based on performance of a predetermined business metric.

16. A method as claimed in claim 1, wherein said step of calculating the performance fee is based on a valuation of a predetermined hard asset.

17. A method as claimed in claim 1, wherein said step of calculating the performance fee includes calculating the performance fee on a performance factor, said performance factor being added to a market return by a risk fee rate to obtain a total investment return.

18. A method as claimed in claim 1, wherein said step of calculating the performance fee includes calculating increasing performance fee percentages for increasing percentages of return on the investment.

19. A method as claimed in claim 1, wherein said relative positive change in value is a net positive change in value of said investment, said net positive change in value being used in said step of calculating said performance fee.

20. A method as claimed in claim 1, wherein said performance characteristics of the investment includes risk reduction of the investment for the investor.

21. A method for improving performance characteristics of an investment, comprising the steps of:
  managing a first investment on behalf of an investor, said managing step being carried out by a manager, said managing step resulting in changes in value of the first investment;
  monitoring performance of the investment by a computer system;
  calculating a performance fee in the computer system, said performance fee being based at least in part on changes in value of the first investment over an accrual calculation period;
  applying the performance fee calculated in said calculating step to an accrual account, said performance fee being applied for relative positive changes in value of the first investment;
  applying a reverse accrual payment from the accrual account to the investor for relative negative changes in value of a second investment over said accrual calculation period so that relative negative changes are offset by the reverse accrual payment to the investor resulting in a transfer of risk from the investor to the manager, said reverse accrual payment being limited to an amount in the accrual account, said reverse accrual payment being executed by the computer system;
  calculating a compensation for the manager for a predetermined period using the computer system, said compensation being a fractional portion of an amount in the accrual account;
  paying to the manager the compensation calculated in said calculating said compensation step;
  carrying forward any remaining balance of the accrual account as a cushion against future reverse accrual payments; and
  periodically repeating said steps of monitoring calculating said performance fee, applying said performance fee, applying said reverse accrual payment, calculating said compensation, paying, and carrying forward any remaining balance;
  wherein said first investment being managed by said manager is separate from said second investment on which said calculating step of said reverse accrual is based.

22. A method for compensating a manager of an investment for an investor, comprising the steps of:
  managing the investment on behalf of the investor, said managing step being carried out by the manager, said managing step resulting in changes in value of the investment;
  monitoring performance of the investment by a computer system;
  calculating a performance fee in the computer system, said performance fee being based at least in part on the changes in value of the investment over an accrual calculation period;
  applying the performance fee to an accrual account, said performance fee being applied only for net positive changes in value of the investment;
  applying a reverse accrual payment from the accrual account to the investor for negative changes in value of the investment over said accrual calculation period so that negative changes are offset by the reverse accrual payment to the investor so that risk is transferred from the investor to the manager, said reverse accrual payment being limited to an amount in the accrual account, said reverse accrual payment being executed by the computer system;
  calculating a compensation for the manager using the computer system;
  paying to the manager the compensation calculated in said calculating step;
  carrying forward any remaining balance of the accrual account as a cushion against future reverse accrual payments; and
  periodically repeating said steps of monitoring, calculating said performance fee, applying said performance fee, applying said reverse accrual payment, calculating said compensation, paying, and carrying forward any remaining balance.

23. A method as claimed in claim 22, wherein said step of calculating the performance fee includes calculating increasing performance fee percentages for increasing percentages of return on the investment.

24. A method as claimed in claim 22, wherein said investment is a composite portfolio of investments.

25. A method as claimed in claim 22, wherein said investment is a third party portfolio of investments.

26. A method for compensating a manager of an investment for an investor, comprising the steps of:
  managing the investment on behalf of the investor, said managing step being carried out by the manager, said managing step resulting in changes in value of the investment;
  monitoring changes in value of the investment using a computer system;
  calculating a performance fee in the computer system, said performance fee being based at least in part on the changes in value of the investment;
  applying the performance fee to an accrual account, said performance fee being applied only for net positive changes in value of the investment;
  applying a reverse accrual payment from the accrual account to the investor for negative changes in value of the investment so that negative changes are offset by the reverse accrual payment to the investor, said reverse accrual payment including a priority investor return of a predetermined percentage in addition to a calculated payment based on negative changes in value so that risk is transferred from the investor to the manager, said reverse accrual payment being limited to an amount of the accrual account, said reverse accrual payment being executed by the computer system;

calculating a compensation for the manager using the computer system, said compensation being a fractional portion of an amount in the accrual account;

paying to the manager the compensation calculated in said calculating step;

carrying forward any remaining balance of the accrual account as a cushion against future reverse accrual payments; and periodically repeating said steps of monitoring, calculating said performance fee, applying said performance fee, applying said reverse accrual payment, calculating said compensation, paying, and carrying forward any remaining balance.

27. A method for compensating a manager of a composite portfolio of investments for investors, comprising the steps of:

managing the composite portfolio of investments on behalf of the investors, said managing step being carried out by the manager, said managing step resulting in changes in value of the composite portfolio of investments;

monitoring performance of the composite portfolio of investments by a computer system;

calculating a performance fee in the computer system, said performance fee being based at least in part on the changes in value of the composite portfolio of investments over an accrual calculation period;

applying the performance fee to an accrual account, said performance fee being applied only for net positive changes in value of the composite portfolio of investments;

applying a reverse accrual payment from the accrual account to the investor for negative changes in value of the investment over said accrual calculation period so that negative changes are offset by the reverse accrual payment to the investor so that risk is transferred from the investor to the manager, said reverse accrual payment being limited to an amount in the accrual account, said reverse accrual payment being executed by the computer system;

calculating a compensation for the manager using the computer system; and paying to the manager the compensation calculated in said calculating step;

carrying forward any remaining balance of the accrual account as a cushion against future reverse accrual payments; and periodically repeating said steps of monitoring, calculating said performance fee, applying said performance fee, applying said reverse accrual payment, calculating said compensation, paying, and carrying forward any remaining balance.

28. A method for compensating a manager of an investment for an investor, comprising the steps of:

managing the composite portfolio of investments on behalf of the investor, said managing step being carried out by the manager, said managing step resulting in changes in value of the composite portfolio of investments;

monitoring performance of the investment by a computer system;

calculating a performance fee in the computer system, said performance fee being based at least in part on third party investments over an accrual calculation period;

applying the performance fee to an accrual account, said performance fee being applied only for net positive changes in value of the third party investments;

applying a reverse accrual payment from the accrual account to the investor for negative changes in value of the third party investments over said accrual calculation period so that negative changes are offset by the reverse accrual payment to the investor so that risk is transferred from the investor to the manager, said reverse accrual payment being limited to an amount in the accrual account, said reverse accrual payment being executed by the computer system;

calculating a compensation for the manager using the computer system, said compensation being a fraction of an amount in said accrual account; and paying to the manager the compensation calculated in said calculating step, and carrying forward any remaining balance of the accrual account as a cushion against future reverse accrual payments; and periodically repeating said steps of monitoring, calculating said performance fee, applying said performance fee, applying said reverse accrual payment, calculating said compensation, paying, and carrying forward any remaining balance.

29. A method as claimed in claim 1, wherein said step of calculating the compensation for the manager is based on a calculation period of at least one year in length.

30. A method as claimed in claim 1, wherein said step of calculating the compensation for the manager is calculated over an increasingly longer period of time beginning at an inception of the manager beginning said managing step.

* * * * *